(12) United States Patent
Borde et al.

(10) Patent No.: US 8,443,188 B2
(45) Date of Patent: May 14, 2013

(54) USING CODE ACCESS SECURITY FOR RUNTIME ACCESSIBILITY CHECKS

(75) Inventors: Shrikrishna V. Borde, Redmond, WA (US); Shawn Farkas, Kirkland, WA (US); Haibo Luo, Kirkland, WA (US); Michael D. Downen, Sammamish, WA (US); Raja Krishnaswamy, Redmond, WA (US); Thottam R. Sriram, Redmond, WA (US); Chris King, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1363 days.

(21) Appl. No.: 11/606,671

(22) Filed: Nov. 30, 2006

(65) Prior Publication Data

US 2008/0134310 A1   Jun. 5, 2008

(51) Int. Cl.
  *H04L 29/06* (2006.01)
  *G06F 12/14* (2006.01)
  *G06F 7/04* (2006.01)
  *G06F 9/44* (2006.01)

(52) U.S. Cl.
  USPC .......... 713/166; 713/165; 713/167; 713/187; 713/188; 726/27; 717/126; 717/127

(58) Field of Classification Search .......... 713/165–167, 713/187, 188; 726/27; 717/126, 127
  See application file for complete search history.

(56) References Cited

U.S. PATENT DOCUMENTS

| | | |
|---|---|---|
| 5,848,232 A | 12/1998 | Lermuzeaux et al. |
| 6,047,377 A | 4/2000 | Gong |
| 6,918,126 B1 | 7/2005 | Blais |
| 6,986,144 B2 | 1/2006 | Krivoruchko |
| 7,089,242 B1 | 8/2006 | Chan et al. |
| 2003/0084324 A1 | 5/2003 | Koved et al. |
| 2003/0172109 A1* | 9/2003 | Dalton et al. ............... 709/203 |
| 2004/0216150 A1 | 10/2004 | Scheifler et al. |
| 2005/0091536 A1* | 4/2005 | Whitmer et al. ............ 713/201 |
| 2006/0070112 A1 | 3/2006 | LaMacchia et al. |
| 2006/0117296 A1 | 6/2006 | Gimness et al. |
| 2007/0124797 A1* | 5/2007 | Gupta et al. ................... 726/1 |
| 2008/0244706 A1* | 10/2008 | Lenoir et al. ................. 726/4 |
| 2009/0055840 A1* | 2/2009 | Hieda .......................... 719/319 |

OTHER PUBLICATIONS

"Protection Domains", http://jdj.sys-con.com/read/35979.htm.
Hawblitzel, et al., "Implementing Multiple Protection Domains in Java", Date: Jun. 1998, http://flint.cs.yale.edu/cs428/doc/hawblitzel98jkernel.pdf.
Rose, et al., "Java Access Protection through Typing", http://www.informatik.fernuni-hagen.de/pi5/tagungen-ecoop_2000/ecoop2000/final_versions/rose.pdf.

* cited by examiner

*Primary Examiner* — Aravind Moorthy

(57) ABSTRACT

Various technologies and techniques are disclosed that use code access security for providing runtime accessibility checks. A request is received from a first program to access at least one private member of a second program at runtime. If the first program has a greater than or equal security context than the second program, then the first program is granted access to the at least one private member of the second program. This code access security check can be provided in a framework environment that is responsible for managing programs that are from unknown or untrusted sources.

20 Claims, 5 Drawing Sheets

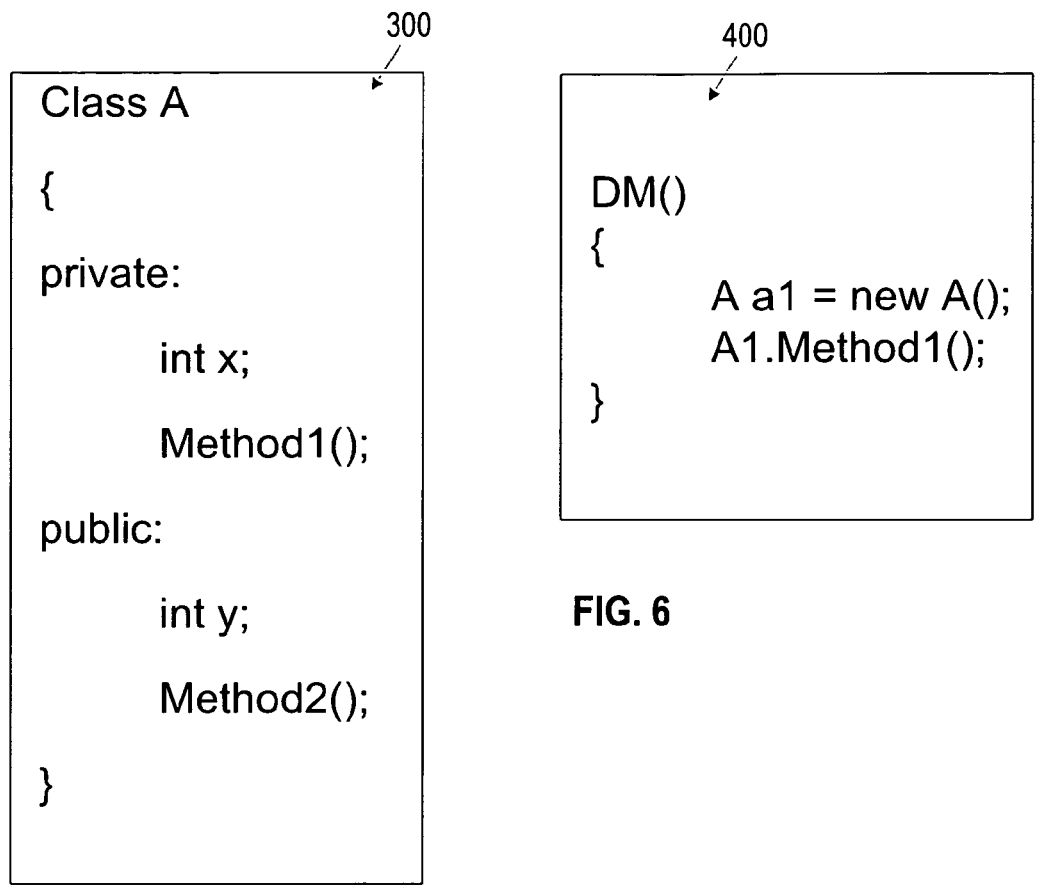
FIG. 5
FIG. 6
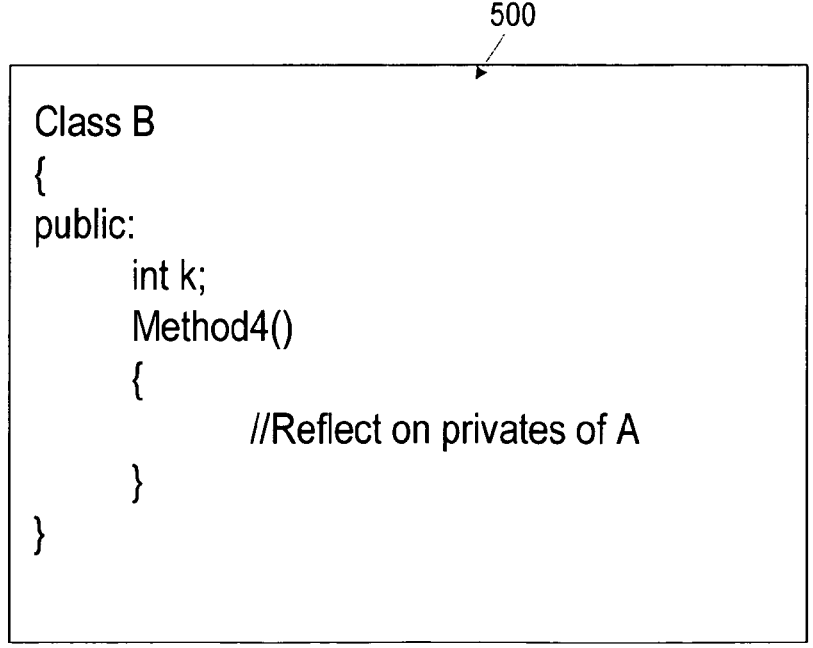
FIG. 7

USING CODE ACCESS SECURITY FOR RUNTIME ACCESSIBILITY CHECKS

BACKGROUND

Security during coding is enforced through accessibility domain checks between classes. At compile time, the compiler will cause accessibility domain checks to be performed to enforce security. If a particular piece of source code tries to access or perform an operation that is not permitted, then a compiler error will occur. For example, a typical accessibility domain may look like the below example.

```
public class A
{
   public static int X;
   internal static int Y;
   private static int Z;
}
internal class B
{
   public static int X;
   internal static int Y;
   private static int Z;
   public class C
   {
      public static int X;
      internal static int Y;
      private static int Z;
   }
   private class D
   {
      public static int X;
      internal static int Y;
      private static int Z;
   }
}
```

In the example shown above, the classes and members have the following accessibility domains:

The accessibility domain of A and A.X is unlimited.
The accessibility domain of A.Y, B, B.X, B.Y, B.C, B.C.X, and B.C.Y is the program text of the containing program.
The accessibility domain of A.Z is the program text of A.
The accessibility domain of B.Z and B.D is the program text of B, including the program text of B.C and B.D.
The accessibility domain of B.C.Z is the program text of B.C.
The accessibility domain of B.D.X, B.D.Y, and B.D.Z is the program text of B.D.

As shown above, the privates of a particular program (such as A.Z) can only be accessed within the containing program. Where finer control across assembly or other program boundaries is desired, friend assemblies are often used. A friend assembly is a specific construct that can be used to specify an internal type or internal member in an assembly or program that can be accessed from another assembly or program. However, even in such scenarios, only those internal types of internal members that are specifically indicated as being friend assemblies or programs can be accessed outside of the containing program.

More and more software is being deployed over the Internet, which has led to the creation of sandbox environments. A sandbox is a test environment in which there are strict limitations on what system resources the program or applet can request or access because executable code comes from unknown or untrusted sources. Because of the increasing number of such sandbox environments, there is more and more need for language engines to run in a restricted trust environment. For this reason, the frameworks operating in those environments need to have finer control than allowed by the simple accessibility domain checks without compromising security.

SUMMARY

Various technologies and techniques are disclosed that use code access security for providing runtime accessibility checks. A request is received from a first program to access at least one private member of a second program at runtime. If the first program has a greater than or equal security context than the second program, then the first program is granted access to the at least one private member of the second program. This code access security check can be provided in a framework environment that is responsible for managing programs that are from unknown or untrusted sources, such as in a sandbox environment over the Internet.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5-7 are hypothetical code examples that illustrate the concept of using some of the techniques discussed in the stages of FIGS. 3-4 in further detail.

DETAILED DESCRIPTION

Figure 1:
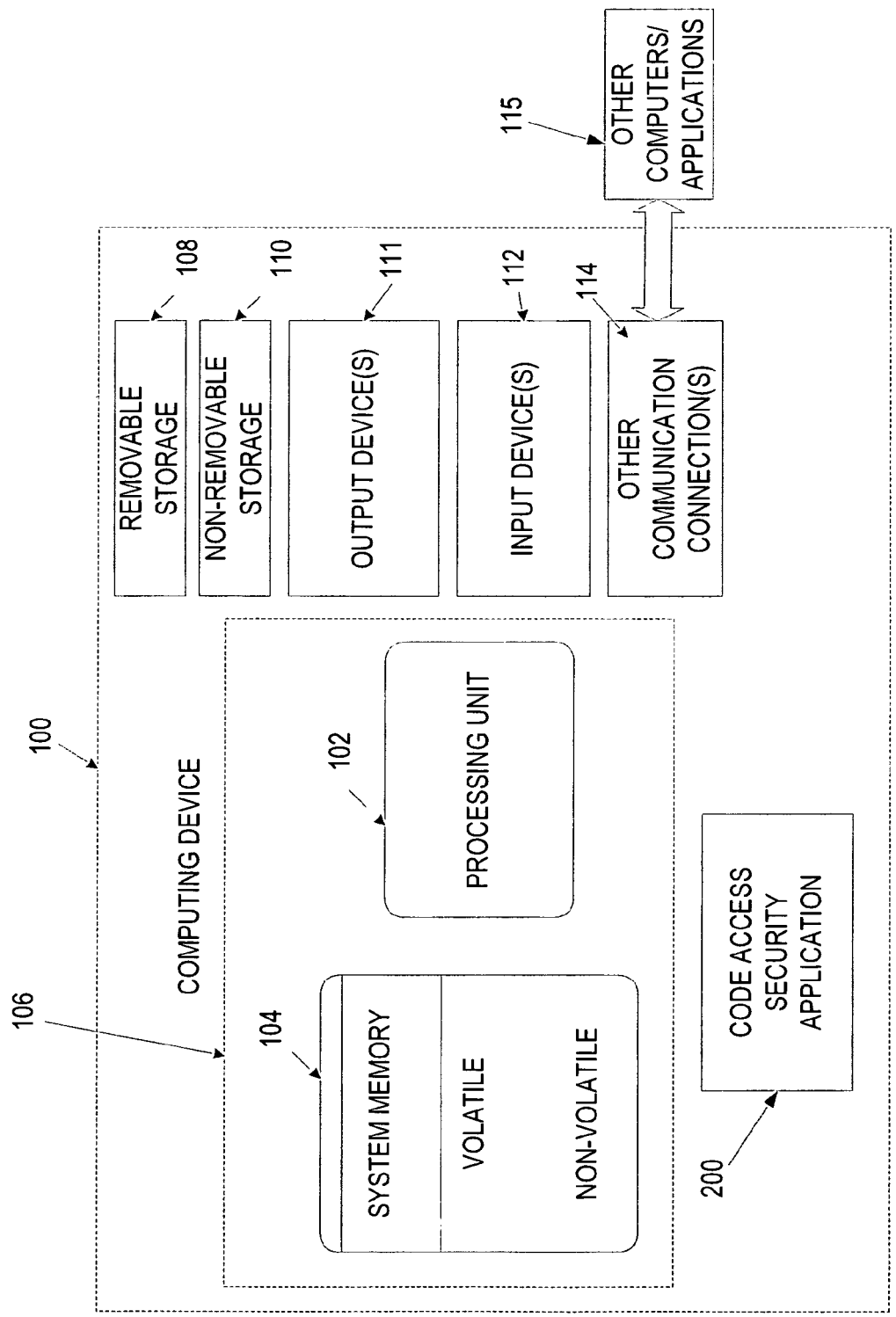
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides security for code access, but the system also serves other purposes in addition to these. In one implementation, one or more of the techniques described herein can be implemented as features within a runtime or language engine environment such as the Common Language Runtime (CLR) that is part of the MICROSOFT®.NET Framework, or from any other type of program or service that handles security for code access. In another implementation, one or more of the techniques described herein are implemented as features with other applications that deal with managing the security context for a particular piece of code.

The term "security context" as used herein means using the characteristics of the code to determine what rights and/or privileges that code can run with. For example, when a piece of code runs, the security context of that code can determine what level of access the code will be granted to other pieces of code and/or to file system operations, etc. One implementation of the techniques and technologies discussed herein deal with allowing a given piece of code with greater than or equal security context than a particular piece of code it wishes to execute to perform privileged operations (i.e. access those pieces of code marked private—such as using reflection). In other words, a runtime way is provided to impose accessibility domains on top of code access security to provide access to privates. This technique is helpful in scenarios where you want to have high security and do not want to allow the code to run with high trust (like in a web sandbox environment). It improves the security of the situation without exposing the file system and other protected resources of the particular computer to other attacks.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes code access security application 200. Code access security application 200 will be described in further detail in FIG. 2.

Figure 2:
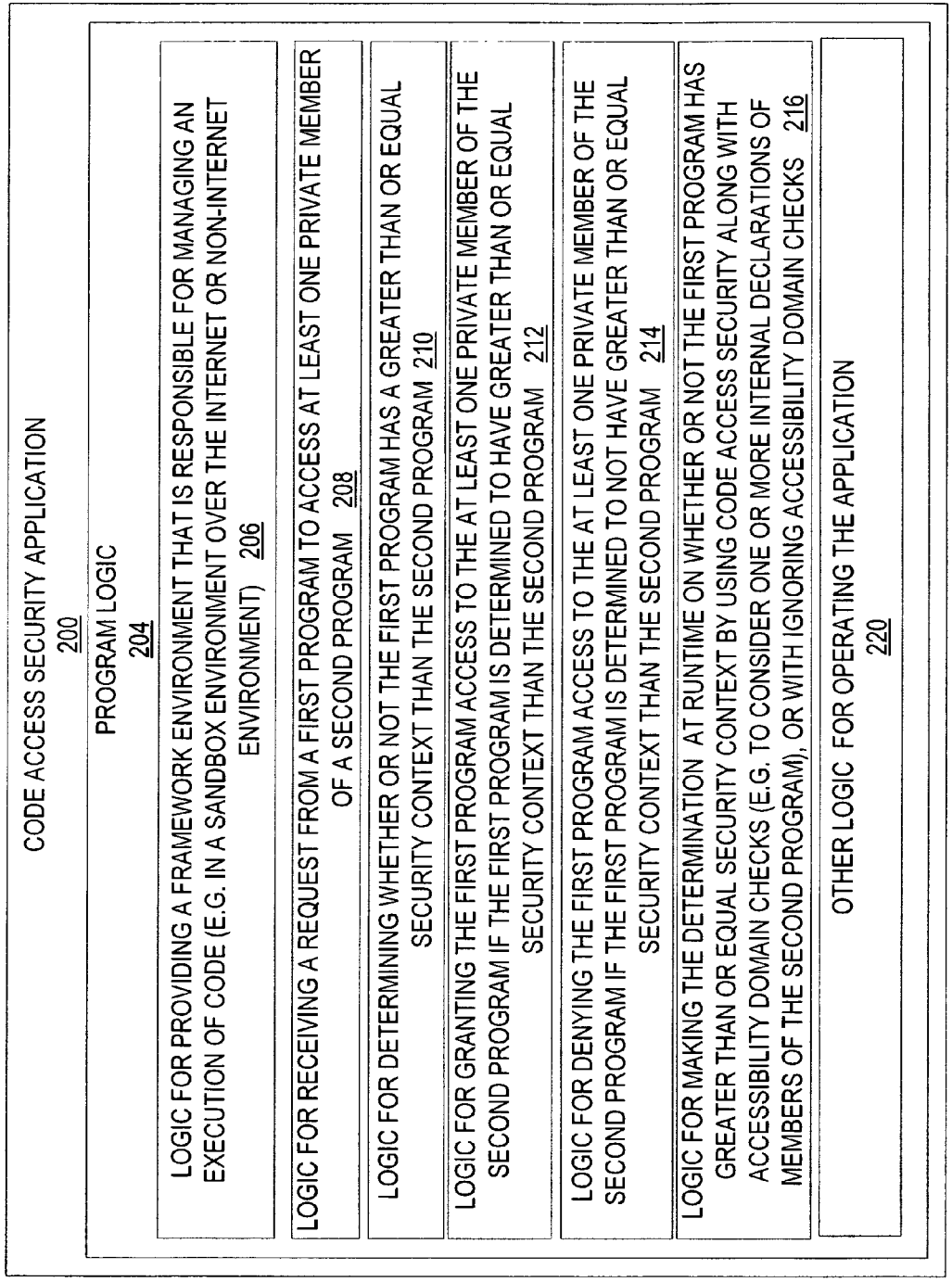
FIG. 2 is a diagrammatic view of a code access security application of one implementation operating on the computer system of FIG. 1.

Turning now to FIG. 2 with continued reference to FIG. 1, a code access security application 200 operating on computing device 100 is illustrated. Code access security application 200 is one of the application programs that reside on computing device 100. However, it will be understood that code access security application 200 can alternatively or additionally be embodied as computer-executable instructions on one or more computers and/or in different variations than shown on FIG. 1. Alternatively or additionally, one or more parts of code access security application 200 can be part of system memory 104, on other computers and/or applications 115, or other such variations as would occur to one in the computer software art.

Code access security application 200 includes program logic 204, which is responsible for carrying out some or all of the techniques described herein. Program logic 204 includes logic for providing a framework environment that is responsible for managing an execution of code (e.g. in a sandbox environment over the internet or non-internet environment) 206; logic for receiving a request from a first program to access at least one private member of a second program 208; logic for determining whether or not the first program has a greater than or equal security context than the second program 210; logic for granting the first program access to the at least one private member of the second program if the first program is determined to have greater than or equal security context than the second program 212; logic for denying the first program access to the at least one private member of the second program if the first program is determined to not have greater than or equal security context than the second program 214; logic for making the determination at runtime on whether or not the first program has greater than or equal security context by using code access security along with accessibility domain checks (e.g. to consider one or more internal declarations of members of the second program), or with ignoring accessibility domain checks 216; and other logic for operating the application 220. In one implementation, program logic 204 is operable to be called programmatically from another program, such as using a single call to a procedure in program logic 204.

Figure 3:
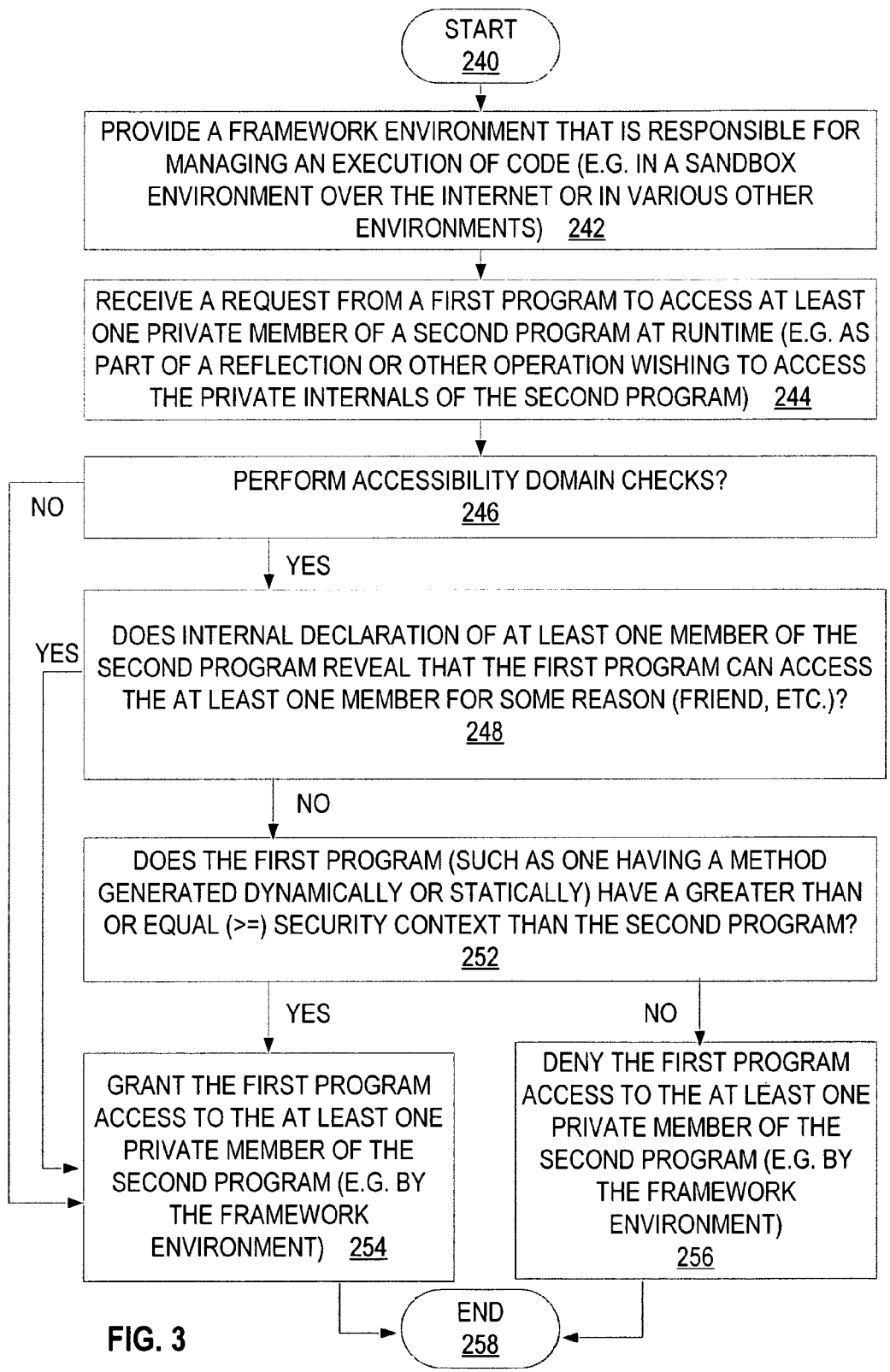
FIG. 3 is a high-level process flow diagram for one implementation of the system of FIG. 1.
Figure 4:
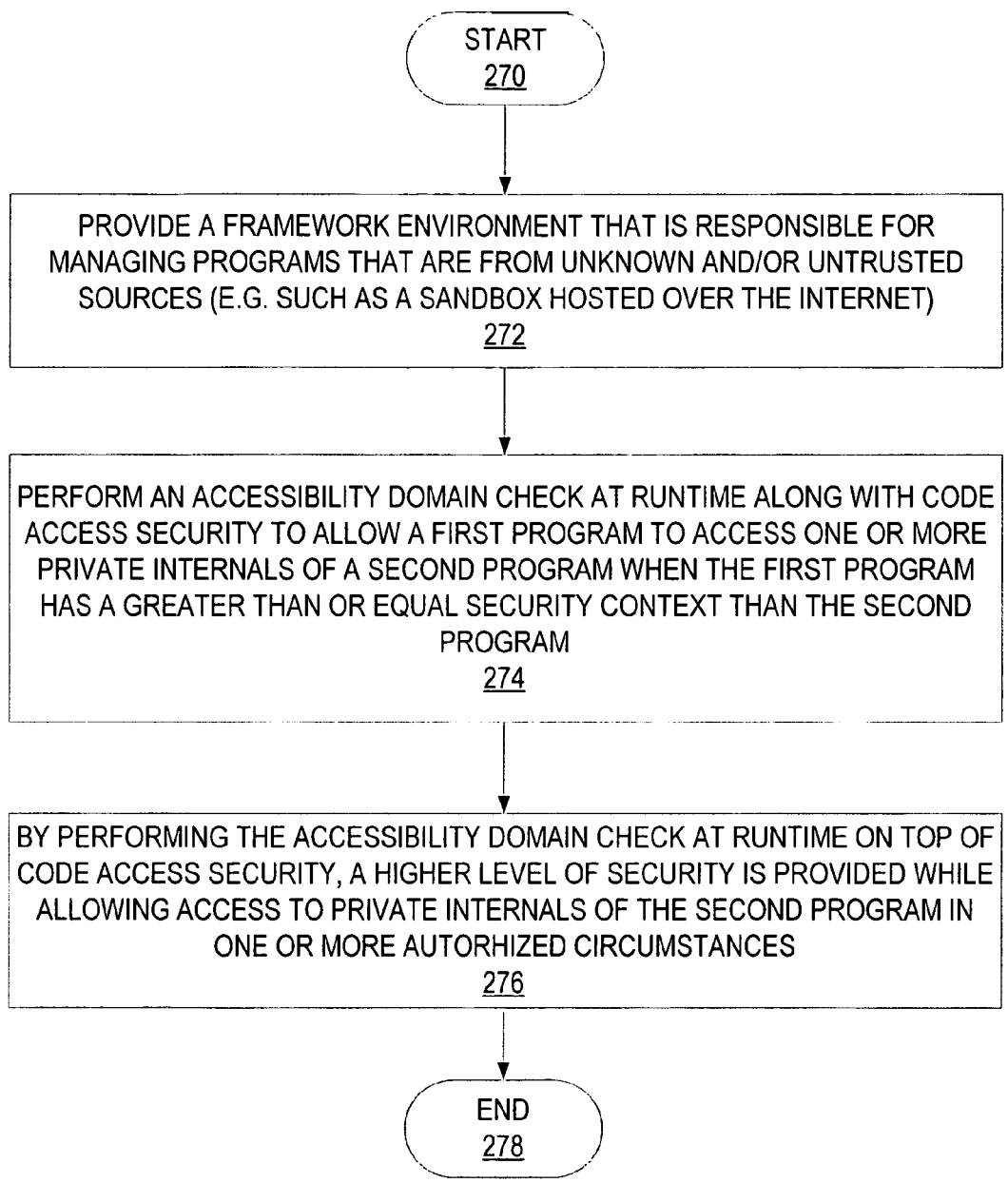
FIG. 4 is a process flow diagram for one implementation of the system of FIG. 1 illustrating the stages involved in using code access security on top of runtime accessibility checks.

Turning now to FIGS. 3-4 with continued reference to FIGS. 1-2, the stages for implementing one or more implementations of code access security application 200 are described in further detail. FIG. 3 is a high level process flow diagram for code access security application 200. In one form, the process of FIG. 3 is at least partially implemented in the operating logic of computing device 100. The procedure begins at start point 240 with providing a framework environment that is responsible for managing an execution of code (e.g. in a sandbox environment over the internet or in various other environments) (stage 242). A request is received from a first program to access at least one private member of a second program at runtime (e.g. as part of a reflection or other operation wishing to access the private internals of the second program) (stage 244).

If the system determines that accessibility-domain checks are to be performed (decision point 246), then the system analyzes the internal declarations of the second program to see if they reveal that the first program can access the at least one internal member for some reason (friend, etc.) (decision point 248). If the internal declaration analysis reveals that the first program can have access to the at least one private member of the second program (decision point 248), then the first program is granted access to the at least one private member of the second program (e.g. by the framework environment) (stage 254). If the internal declaration analysis reveals that the first program cannot have access to the at least one private member (decision point 248), then the system performs a security context check to determine whether or not the first program (such as one having a method generated dynamically or statically) has a greater than or equal ($>=$) security context than the second program (decision point 252). If yes (decision point 252), then the first program is granted access to the at least one private member of the second program (e.g. by the framework environment) (stage 254). If no, then the first program is denied access to the at least one private member of the second program (e.g. by the framework environment) (stage 256).

If the system determines that accessibility domain checks are not to be performed (decision point 246), then the system grants access to the at least one private member of the second program (stage 254). The process ends at end point 258.

FIG. 4 illustrates one implementation of the stages involved in using code access security on top of runtime accessibility checks. In one form, the process of FIG. 4 is at least partially implemented in the operating logic of computing device 100. The procedure begins at start point 270 with providing a framework environment that is responsible for managing programs that are from unknown an/or untrusted sources (e.g. such as a sandbox hosted over the internet) (stage 272). An accessibility domain check is performed at runtime along with code access security to allow a first program to access one or more private internals of a second program when the first program has a greater than or equal security context than the second program (stage 274). By performing the accessibility domain check at runtime on top of code access security, a higher level of security is provided while allowing access to private internals of the second program in one or more authorized circumstances (stage 276). The process ends at end point 278.

Turning now to FIGS. 5-7, hypothetical code examples are shown to illustrate the concept of using some of the techniques discussed in the stages of FIGS. 3-4 in further detail. FIG. 5 is a code example 300 that is compiled as "A.dll" with a permission set of PS1. FIG. 6 shows a code example 400 of a dynamic method that is then created based upon A.dll from FIG. 5. If the assembly that is hosting dynamic method has equal or greater permission as the assembly hosting A and everyone in the calling stack of the dynamic method has the same then the system would allow access to A's privates from the dynamic method. This example could be modified to a static method as opposed to a dynamic method and could still use the techniques discussed herein.

FIG. 7 is a code example 500 that is compiled as "B.dll" with a permission set PS2. In the example shown, a method in class B wants to reflect on privates in class A in assembly A. B will be allowed to reflect on A's privates if A.PermissionSet is satisfied. In one implementation, a full demand is performed. In other words, B and all callers of B must have equal or greater privilege than A. Also, if B is a framework assembly, it does not have to worry about security, since all its callers also need to have equal or greater permissions than A. In one implementation, this scenario is secure because B could perform every operation that A could. B could just include the intermediate language of A in itself. Hence, there is no elevation of privilege if B accesses non-public data of A.

In one implementation, a feature of allowing creation of dynamic methods without any privileges is also supported. This will be referred as anonymously-hosted dynamic method. Normally, creating a dynamic method requires that the creator have at least the privileges of the assembly that the dynamic method is associated with. However, for anonymously-hosted dynamic methods, a separate assembly which hosts only the anonymously-hosted dynamic methods is used. Thus, a dynamic method can be created without specifying an assembly to host it. In this case, sandboxed code can be allowed to emit the dynamic method since the system knows that it is not gaining access to the internals of another assembly, as it is not specifying that it wants to be hosted in any assembly at all. In other words, since the assembly does not contain any data, it cannot be the target of an access. This implies that any data accessed by the dynamic method must be in another assembly. When the anonymously-hosted dynamic method is created, the creator does not require any privileges. The anonymously-hosted dynamic method will automatically be checked for the privileges of the data it tries to access.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing code access security comprising the steps of:
   receiving a request from a first program to access at least one private member of a second program at runtime, wherein the first program is without declared permission to access the at least one private member of the second program;
   determining a security context of the first program by using its characteristics to determine what rights and/or privileges the first program can run with;
   determining a security context of the second program by using its characteristics to determine what rights and/or privileges the second program can run with; and
   if the first program has a greater than or equal security context than the second program, then granting the first program access to the at least one private member of the second program, wherein the code access security based on security contexts can be used in addition to express access declarations to grant the first program access to the at least one private member of the second program.

2. The method of claim 1, further comprising:
   if the first program does not have the greater than or equal security context than the second program, then denying the first program access to the at least one private member of the second program.

3. The method of claim 1, wherein the access to the at least one private member requested is part of a reflection operation being performed against the second program by the first program.

4. The method of claim 1, wherein at least one of the receiving and granting stages are performed by a framework environment that is responsible for managing an execution of code.

5. The method of claim 4, wherein the framework environment is operable to run in a sandbox environment over an Internet.

6. The method of claim 1, wherein the first program contains a method that was generated dynamically.

7. The method of claim 6, wherein the dynamically generated method is the one requesting access to the second program.

8. The method of claim 1, wherein the first program and the second program are part of a same larger program.

9. The method of claim 1, wherein an accessibility domain check is also performed before access to the second program is granted.

10. The method of claim 9, wherein the accessibility domain check comprises:
    analyzing an internal declaration of at least one member of the second program to see whether or not the first program can access the at least one member based upon the internal declaration.

11. A manufactured computer-readable medium having computer-executable instructions for causing a computer to perform the steps recited in claim 1.

12. A computer storage medium having computer-executable instructions for causing a computer to perform steps comprising:
    provide a framework environment that is responsible for managing an execution of code;
    receive a request from a first program to access at least one private member of a second program, wherein the first program is without declared permission to access the at least one private member of the second program;
    determine a security context of the first program by using its characteristics to determine what rights and/or privileges the first program can run with;
    determine a security context of the second program by using its characteristics to determine what rights and/or privileges the second program can run with;
    determine whether or not the first program has a greater than or equal security context than the second program;
    if the first program has the greater than or equal security context than the second program, then grant the first program access to the at least one private member of the second program; and
    if the first program does not have the greater than or equal security context than the second program, then denying the first program access to the at least one private member of the second program, wherein the determination of greater than or equal security context can be used in addition to express access declarations to grant the first program access to the at least one private member of the second program.

13. The computer storage medium of claim 12, wherein the framework environment is operable to run in a sandbox environment over an Internet.

14. The computer storage medium of claim 12, wherein the framework environment is operable to perform the determination of whether or not the first program has the greater than or equal security context by using accessibility domain checks at runtime along with code access security.

15. The computer storage medium of claim 14, wherein by using accessibility domain checks at runtime along with code access security, one or more internal declarations of one or more members of the second program are considered as part of the determination.

16. The computer storage medium of claim 12, wherein the framework environment is operable to perform the determination of whether or not the first program has the greater than or equal security context by using code access security and ignoring one or more internal declarations of one or more members of the second program.

17. A method for improving security for a framework environment hosted in a sandbox comprising the steps of:
    providing a framework environment that is responsible for managing programs that are from untrusted sources;
    determining a security context of a first program by using its characteristics to determine what rights and/or privileges the first program can run with, wherein the first program is without declared permission to access a private member of a second program;
    determining a security context of a second program by using its characteristics to determine what rights and/or privileges the second program can run with; and
    performing an accessibility domain check along with code access security at runtime, wherein the code access security allows the first program to access one or more private internals of the second program when the first program has a greater than or equal security context than the second program, and wherein the accessibility domain check allows the first program to access the one or more private internals of the second program based on an express access declaration.

18. The method of claim 17, wherein the framework environment is hosted over an Internet.

19. The method of claim 17, wherein a higher level of security is provided while allowing access to the private internals of the second program in one or more authorized circumstances.

20. A computer storage medium having computer-executable instructions for causing a computer to perform the steps recited in claim 17.

* * * * *